United States Patent
Erndt et al.

(10) Patent No.: US 12,343,825 B2
(45) Date of Patent: Jul. 1, 2025

(54) SYSTEM FOR TIG SHIELDING GAS PREFLOW, POSTFLOW, AND ARC STARTING

(71) Applicant: Illinois Tool Works Inc., Glenview, IL (US)

(72) Inventors: Zachary Joseph Erndt, Waupaca, WI (US); Al J. DeCoster, Kaukauna, WI (US)

(73) Assignee: Illinois Tool Works Inc.

( * ) Notice: Subject to any disclaimer, the term of this patent is extended or adjusted under 35 U.S.C. 154(b) by 766 days.

(21) Appl. No.: 16/671,944

(22) Filed: Nov. 1, 2019

(65) Prior Publication Data

US 2020/0139472 A1 May 7, 2020

Related U.S. Application Data

(60) Provisional application No. 62/755,126, filed on Nov. 2, 2018.

(51) Int. Cl.
| | | |
|---|---|---|
| *B23K 9/095* | (2006.01) | |
| *B23K 9/09* | (2006.01) | |
| *B23K 9/10* | (2006.01) | |
| *B23K 9/173* | (2006.01) | |
| *B23K 9/133* | (2006.01) | |

(52) U.S. Cl.
CPC ............ *B23K 9/0953* (2013.01); *B23K 9/092* (2013.01); *B23K 9/1062* (2013.01); *B23K 9/1087* (2013.01); *B23K 9/133* (2013.01); *B23K 9/173* (2013.01)

(58) Field of Classification Search
CPC ...... B23K 9/09; B23K 9/0953; B23K 9/0956; B23K 9/092; B23K 9/10; B23K 9/1062; B23K 9/1087; B23K 9/133; B23K 9/173; B23K 10/006; B23K 31/125; B23K 35/383; B23K 9/067; B23K 9/0673; B23K 9/073; B23K 9/0738; B23K 9/093; B23K 9/095; B23K 9/1043; B23K 9/1056; B23K 9/16

USPC ............ 219/121.55, 130.21, 130.31, 121.39, 219/121.44, 121.54, 121.57, 130.1, 219/130.33, 130.4, 132

See application file for complete search history.

(56) References Cited

U.S. PATENT DOCUMENTS

| | | | |
|---|---|---|---|
| 4,100,390 A | 7/1978 | Jackson | |
| 4,493,969 A | 1/1985 | Legrand | |
| 4,570,050 A | 2/1986 | Veal | |
| 5,117,088 A | 5/1992 | Stava | |
| 5,424,507 A * | 6/1995 | Yamaguchi | B23K 10/006 |
| | | | 219/121.57 |
| 5,609,782 A | 3/1997 | Kim | |
| 6,034,350 A | 3/2000 | Heraly | |
| 6,075,224 A | 6/2000 | DeCoster | |
| 6,103,994 A | 8/2000 | DeCoster | |
| 6,515,259 B1 | 2/2003 | Hsu | |
| 6,548,784 B2 * | 4/2003 | Sammons | B23K 9/1062 |
| | | | 219/130.21 |
| 7,820,943 B2 * | 10/2010 | Beistle | B23K 9/0953 |
| | | | 219/130.21 |

(Continued)

*Primary Examiner* — Chris Q Liu
(74) *Attorney, Agent, or Firm* — MCANDREWS HELD & MALLOY LTD.

(57) ABSTRACT

A welding-type system for gas tungsten arc welding including control circuitry to control the initiation of a welding arc and the preflow and postflow of inert shielding gas based on sensed voltages.

20 Claims, 7 Drawing Sheets

(56) References Cited

U.S. PATENT DOCUMENTS

| | | | |
|---|---|---|---|
| 8,129,652 B2* | 3/2012 | Hampton | B23K 9/0956 |
| | | | 219/137.2 |
| 9,108,263 B2 | 8/2015 | Manthe | |
| 10,427,237 B2* | 10/2019 | Ulrich | B23K 9/0956 |
| 10,722,967 B2* | 7/2020 | Peters | B23K 9/173 |
| 11,110,536 B2* | 9/2021 | Fleming | B23K 9/093 |
| 2004/0238511 A1* | 12/2004 | Matus | B23K 9/167 |
| | | | 219/130.4 |
| 2008/0264915 A1* | 10/2008 | Manthe | B23K 9/0673 |
| | | | 219/130.31 |
| 2011/0163072 A1* | 7/2011 | Vogel | B23K 9/1043 |
| | | | 219/130.33 |
| 2013/0262000 A1* | 10/2013 | Hutchison | B23K 9/09 |
| | | | 702/58 |
| 2014/0251968 A1 | 9/2014 | Peters | |
| 2016/0129514 A1 | 5/2016 | Schartner | |
| 2016/0136764 A1* | 5/2016 | Enyedy | B23K 10/006 |
| | | | 219/74 |
| 2018/0214966 A1* | 8/2018 | Peters | B23K 9/173 |
| 2018/0214969 A1* | 8/2018 | Fleming | B23K 9/173 |

\* cited by examiner

SYSTEM FOR TIG SHIELDING GAS PREFLOW, POSTFLOW, AND ARC STARTING

CROSS-REFERENCE TO RELATED APPLICATIONS

This application claims priority from and the benefit of U.S. Provisional Application. No. 62/755,126, entitled "SYSTEM FOR TIG SHIELDING GAS PREFLOW, POSTFLOW, AND ARC STARTING," filed Nov. 2, 2018, the entirety of which is hereby incorporated by reference in its entirety for all purposes.

BACKGROUND

The present disclosure relates to welding systems and, more particularly, to systems and methods for controlling and using a tungsten inert gas ("TIG") process.

Welding is a process that has increasingly become ubiquitous in all industries. There are many different welding processes. One welding process is a TIG process, also called gas tungsten arc welding ("GTAW"). TIG welding is an arc welding process that uses a non-consumable tungsten electrode to produce the weld. The weld area is protected from atmospheric contamination by an inert shielding gas, and a filler metal is typically used. Various systems, devices, and methods for initiating and controlling a TIG process may be used.

SUMMARY

The present disclosure relates to welding systems and, more particularly, to systems and methods for controlling a GTAW process, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numerals are used to refer to similar or identical elements.

DETAILED DESCRIPTION

Figure 1:
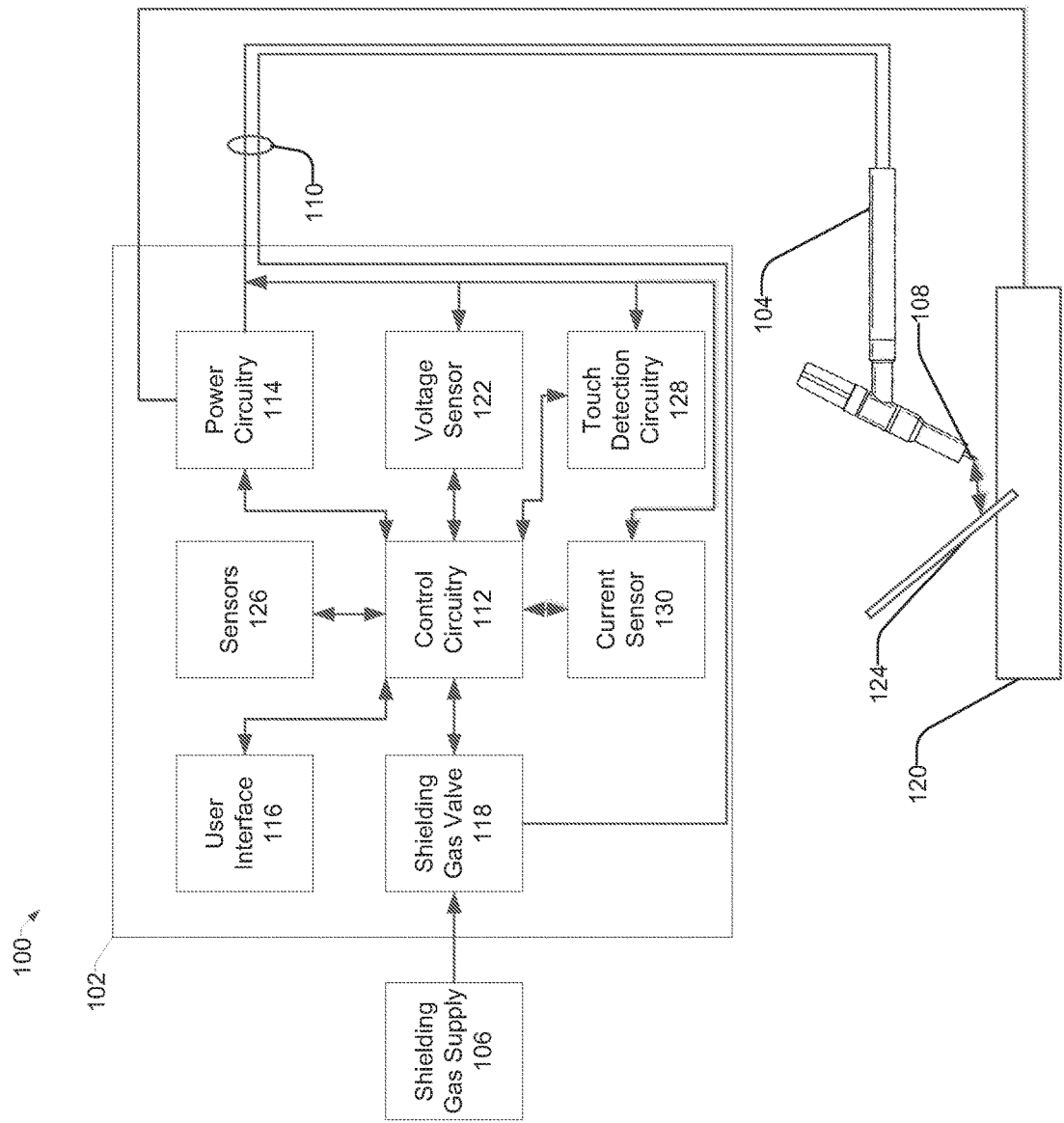
FIG. 1 is a block diagram of an example GTAW welding system, in accordance with aspects of this disclosure.

In gas tungsten arc welding (GTAW) systems, a metal electrode, typically made of tungsten, is provided in a welding torch, and is generally not consumed (i.e., added to the base metal) during welding. Electric current is channeled through the electrode, and a flow of an inert shielding gas surrounds the electrode during the welding operation, generally provided by fluid conduits leading to the welding torch. An arc is struck between the electrode and the workpiece to melt the workpiece and filler metal. Shielding gas prevents oxidation and other contamination of the electrode and/or the weld.

Conventional methods of starting a GTAW process include using high-frequency signals, lift start, and scratch start. With lift starts, the operator touches the electrode to the workpiece, which may initiate shielding gas preflow and welding-type power output based on the detection of a closed (short) circuit between the electrode and the workpiece. Then, as the electrode is drawn away from the workpiece, the arc is struck. Scratch starts involve sweeping the tungsten over and in contact with the workpiece to strike an arc. Contact TIG starts such as scratch start and lift start have the potential of leaving traces of the non-consumable electrode, resulting in contamination known as tungsten inclusion and/or eroding the tungsten geometry. Tungsten inclusion is particularly a problem for non-high-frequency (HF) starts, and most particularly a problem for scratch starts.

HF starts are advantageous in some situations, but also require specific controls such as a remote pedal to start shielding gas preflow and the HF signal. Therefore, it would be advantageous for an HF starting system to not require special controls. HF starting also cannot be used in every situation, as the HF signals can cause interference with other equipment. Therefore, additional GTAW arc starting systems and methods are also desirable.

"Flick" starting is an arc starting method sometimes used to prevent tungsten inclusion. Flick starting may use the same control system as a traditional lift start or scratch start. When flick starting, an operator briefly makes contact between the tungsten electrode and the filler metal rod, with the filler metal rod also touching the workpiece. The contact between the electrode and the filler metal rod initiates the welding arc similarly to lift starting. Because the tungsten electrode does not contact the workpiece, tungsten inclusion is less likely. However, there is less time for shielding gas preflow because the contact between the electrode and the filler metal rod is fleeting. Therefore, flick starting may require the use of specially designed valve torches. With a specially designed valve torch, an operator may manually open a valve to allow for shielding gas to flow, and then initiate the arc via flick starting. A valve torch is challenging to operate because GTAW operation requires the use of one hand to operate the torch and the other hand to manipulate the filler metal rod, thereby making it difficult to manually control the shielding gas flow. A valve torch can also lead to insufficient shielding gas coverage if not opened "enough," contaminated shielding if opened to the extent that atmospheric gases are introduced through the valve, contaminated shielding if the o-ring is wore and introduces atmospheric gases due to the valve leaking, no coverage if the valve is not opened, and/or the waste of shielding gas if the valve is left open when not needed or welding is not taking place. The valve torch also is undesirable in many cases due to the valved mechanical design restricting the way of holding the torch resulting in discomfort. Systems and methods that allow for adequate shielding gas preflow with a flick starting method, without the need for a specially designed torch, are desirable.

Disclosed example welding-type systems include a welding-type power supply configured to output welding-type power to a welding-type torch; and control circuitry configured to: control the welding-type power supply to disable output of the welding-type power based on an absence of a welding-type arc; detect a first electrical short circuit between an electrode and a workpiece; in response to the detection of the first electrical short circuit, control a shielding gas valve to enable a flow of shielding gas to the welding-type torch, the welding-type torch holding the electrode; detect a second electrical short circuit between the electrode and the workpiece; and control the welding-type power supply to output the welding-type power in response to the detection of the second electrical short circuit.

In some disclosed example welding-type systems, the control circuitry is configured to: monitor a first time period of the first electrical short circuit and a second time period of the second electrical short circuit; control the shielding gas valve to enable the flow of the shielding gas when the first time period satisfies a first threshold time period; and control the welding-type power supply to output the welding-type power when the second time period satisfies a second threshold time period.

In some disclosed example welding-type systems, the control circuitry is configured to: monitor a first time period between the first electrical short circuit and the second electrical short circuit; and control the shielding gas valve to terminate the flow of shielding gas if the first time period satisfies a threshold time period.

In some disclosed example welding-type systems, the control circuitry is configured to: detect termination of a welding arc after initiation of the welding arc generated using the welding-type power; and control the shielding gas valve to terminate the flow of shielding gas in response to detecting the termination of the welding arc. In some disclosed example welding-type systems, the control circuitry controls the shielding gas valve to terminate the flow of shielding gas after a delay following detecting the termination of the welding arc.

Disclosed example welding-type systems include a welding-type power supply configured to output welding-type power to a welding-type torch; an arc initiation circuit configured to output an arc initiation output to the welding-type torch; and control circuitry configured to: control the welding-type power supply to disable output of the welding-type power based on an absence of a welding-type arc; detect an electrical short circuit between an electrode and a workpiece, the welding-type torch holding the electrode; and based on the detection of the electrical short circuit, control the welding-type power supply to output the welding-type power and control the arc initiation circuit to output the arc initiation output.

In some disclosed example welding-type systems, the arc initiation circuit is a high-frequency voltage circuit and the arc initiation output is a high-frequency high-voltage output.

In some disclosed example welding-type systems, the control circuitry is configured to control the welding-type power supply to output the welding-type power and control the arc initiation circuit to output the arc initiation output after a delay following the detection of the electrical short circuit.

In some disclosed example welding-type systems the control circuitry is configured to: monitor a time period of the electrical short circuit, and control the welding-type power supply to output the welding-type power and control the arc initiation circuit to output the arc initiation output when the time period satisfies a threshold time period.

In some disclosed example welding-type systems the control circuitry is configured to control the welding-type power supply to output the welding-type power and control the arc initiation circuit to output the arc initiation output after a delay after detecting termination of the electrical short circuit.

In some disclosed example welding-type systems the control circuitry is configured to the control circuitry is configured to monitor a time period of the electrical short circuit, and a duration of the delay is based on the monitored time period of the electrical short circuit.

In some disclosed example welding-type systems the control circuitry is configured to, in response to the detection of the electrical short circuit, control a shielding gas valve to enable a flow of shielding gas to the welding-type torch.

In some disclosed example welding-type systems the control circuitry is configured to: detect termination of a welding arc after initiation of the welding arc generated using the welding-type power; and control the shielding gas valve to terminate the flow of shielding gas in response to detecting the termination of the welding arc. In some disclosed example welding-type systems, the control circuitry controls the shielding gas valve to terminate the flow of shielding gas after a delay following detecting the termination of the welding arc.

Disclosed example welding-type systems include: a welding-type power supply configured to output welding-type power to a welding-type torch; an arc initiation circuit configured to output an arc initiation output to the welding-type torch; and control circuitry configured to: control the welding-type power supply to disable output of the welding-type power based on an absence of a welding-type arc; detect an electrical short circuit between an electrode and a workpiece, the welding-type torch holding the electrode; detect termination of the electrical short circuit; and in response to the detection of the termination of the electrical short circuit, control the welding-type power supply to output the welding-type power and control the arc initiation circuit to output the arc initiation output.

In some disclosed example welding-type systems, the control circuitry is configured to, in response to the detection of the electrical short circuit, control a shielding gas valve to enable a flow of shielding gas to the welding-type torch.

In some disclosed example welding-type systems, the control circuitry is configured to: detect termination of a welding arc after initiation of the welding arc generated using the welding-type power; and control the shielding gas valve to terminate the flow of shielding gas in response to detecting the termination of the welding arc. In some disclosed example welding-type systems, the control circuitry controls the shielding gas valve to terminate the flow of shielding gas after a delay following detecting the termination of the welding arc.

In some disclosed example welding-type systems, the control circuitry is configured to control the welding-type power supply to output the welding-type power and control the arc initiation circuit to output the arc initiation output after a delay after detecting termination of the electrical short circuit.

In some disclosed example welding-type systems, the arc initiation circuit is a high-frequency voltage circuit and the arc initiation output is a high-frequency high-voltage output.

FIG. 1 shows a block diagram of an example GTAW welding-type system 100. The example system 100 includes a welding power supply 102, a torch 104, and a shielding gas supply 106. The torch 104 holds an electrode 108. In the example of FIG. 1, the electrode 108 is a non-consumable tungsten electrode. The torch 104 receives power from the power supply 102 and receives inert shielding gas (typically argon or helium) from a shielding gas supply 106 via conduit 110. The conduit 110 may contain one or more control cables, power cables, and a shielding gas conduit. The power supply 102 includes control circuitry 112, which may include a general purpose or application-specific microprocessor or microcontroller, programmable logic controller (PLC), or other programmed control circuitry. The power supply 102 includes power circuitry 114 that is configured to output welding-type power to the torch 104.

The power circuitry 114 draws input power from a power grid, an engine-driven generator, a battery or other energy storage device, and/or or from another source of power. The example power circuitry 114 rectify and/or pre-regulate an input AC waveform to generate a DC bus voltage, from which the power circuitry 114 may convert to output welding-type power based on the desired weld process.

The power supply 102 also includes a user interface 116. An operator may select welding parameters via the user interface 116. For example, the welding parameters may include output current and/or voltage settings (frequency and/or amplitude), shielding gas settings, arc initiation settings, and/or any other welding parameters. The shielding gas supply 106 is connected to the conduit 110 via a shielding gas valve 118. The shielding gas valve 118 controls the flow of shielding gas to the torch 104. The control circuitry 112 controls the power circuitry 114, the user interface 116, and the shielding gas valve 118.

The power circuitry 114 is also electrically connected to a workpiece 120, in order to complete a circuit between the power circuitry 114, the torch 104, and the workpiece 120. In some examples, a voltage sensor 122 detects a weld voltage. In some examples, a current sensor 130 detects a weld current. The weld voltage may be measured between the electrode 108 and the workpiece 120 (e.g., near the torch 104), at output terminals of the power supply 102, and/or any other location representative of the output voltage and/or the arc voltage. The control circuitry 112 may receive a signal from the voltage sensor 122 indicative of the weld voltage between the electrode 108 and the workpiece 120.

In some examples, a low current touch detection circuit 128 may be used in parallel with the power circuitry 114 to detect a short circuit. For example, the touch detection circuitry 128 outputs a voltage between the torch 104 and the workpiece 108 with a low-current output to prevent arcing. When the low current touch detection circuitry 128 detects that an output current is flowing from the touch detection circuitry 128, the low current touch detection circuitry 128 detects the short circuit and provides a signal to the control circuitry 112.

In some examples, an operator may select an arc initiation method via the user interface 116. For example, an operator may select a lift start, a scratch start, a flick start, or one of the presently disclosed methods, for example methods 200 or 300 as described in more detail below with reference to FIGS. 2 and 3.

The example system 102 enables an operator to perform GTAW welding using an enhanced flick starting method, in which the shielding gas flow and starting power are automatically controlled to reduce the complexity of starting the arc for the operator. Example processes to implement the enhanced flick starting method are disclosed below with reference to FIGS. 2 and 3.

Figure 2:
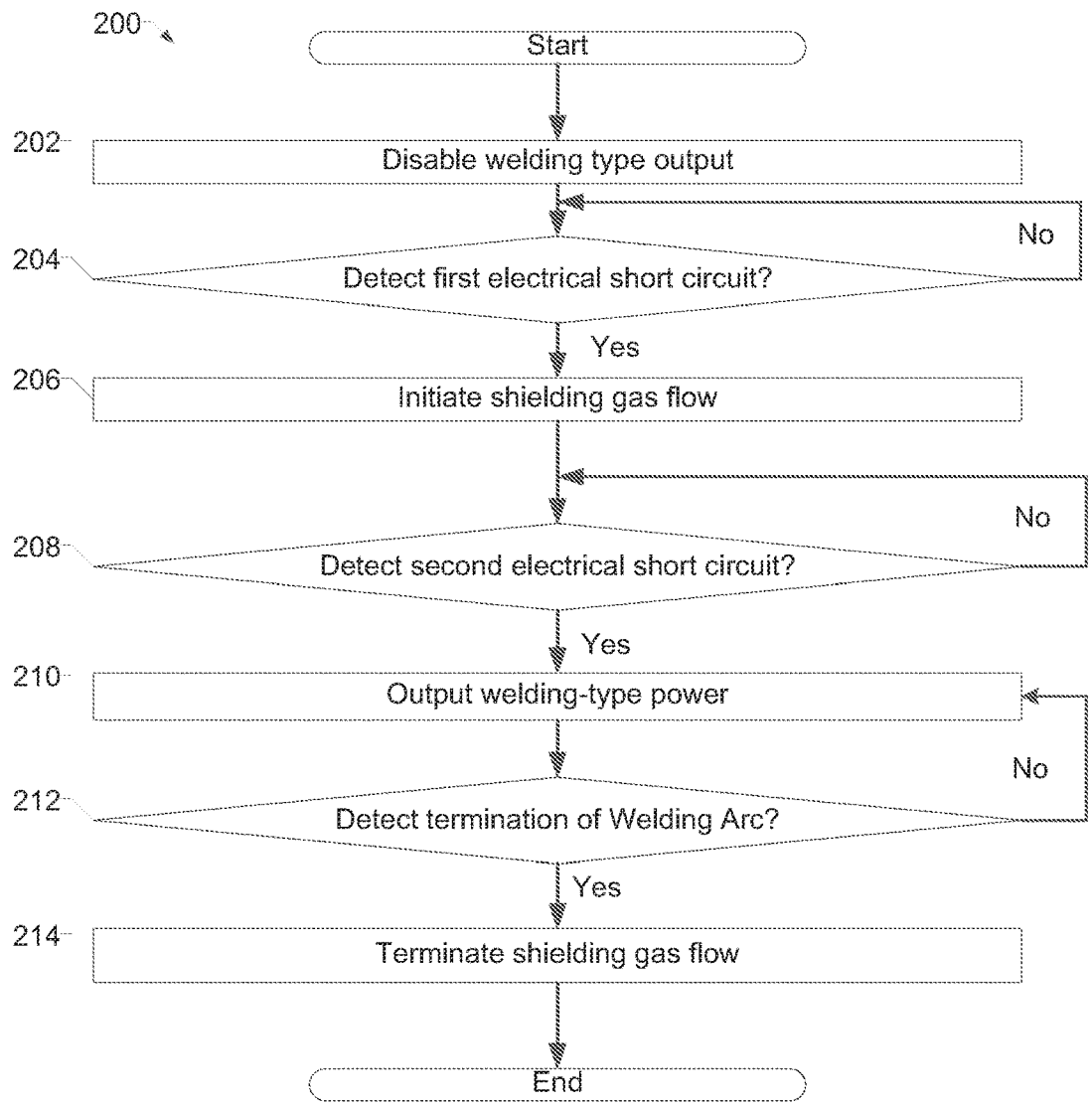
FIG. 2 is a flow chart representative of example machine readable instructions which may be executed by the power supply of FIG. 1 to initiate and control a GTAW welding process.

FIG. 2 is a flow chart representative of example machine readable instructions 200 which may be executed by the power supply 102 of FIG. 1 to initiate and control starting of a GTAW welding process. The machine readable instructions 200 may be partially or completely implemented by the control circuitry 112 of FIG. 1. The example instructions 200 begin while no welding is taking place (e.g., while no arc is present, such as prior to a welding operation).

At block 202, the control circuitry 112 disables the welding-type output from the power circuitry 114. Disabling the welding-type output can include any of physically and/or electrically disconnecting the power circuitry 114 from the output (i.e. disconnecting the electrode 108 from the power circuitry 114), controlling the power circuitry 114 to not generate an output, and/or any other method of preventing or blocking output from the power circuitry 114.

At block 204, the control circuitry 112 detects whether a first electrical short circuit between the electrode 108 and the workpiece 120 has occurred. For example, the control circuitry 112 may monitor the output of the voltage sensor 122 to determine whether the voltage has dropped below a threshold indicative of a short circuit between the torch 104 and the workpiece 108 (e.g., via the filler metal rod 124). In some other examples, touch detection circuitry 128 may be used in parallel with the power circuitry 114 to detect a short circuit. For example, the touch detection circuitry 128 outputs a voltage between the torch 104 and the workpiece 108 with a low-current output to prevent arcing. When the low current touch detection circuitry 128 detects that an output current is flowing from the touch detection circuitry 128, the low current touch detection circuitry 128 detects the short circuit and provides a signal to the control circuitry 112.

If no electrical short circuit is detected (block 204), then the control circuitry 112 returns to block 204 and continues monitoring for a short circuit. If the control circuitry 112 detects a first electrical short circuit (block 204), at block 206 the control circuitry 112 initiates a shielding gas flow to the torch 104. For example, the control circuitry 112 may initiate the shielding gas flow by commanding the shielding gas valve 118 to open. In some examples, the control circuitry 112 delays initiating the shielding gas flow for a predetermined period of time after detecting the first electrical short circuit. The predetermined period of time may be preset or set by an operator via the user interface 116.

At block 208, the control circuitry 112 attempts to detect a second electrical short circuit between the electrode 108 and the workpiece 120. If an electrical short circuit is not detected (block 208), then the control circuitry 112 returns control to block 208 to continue to monitor for the second electrical short circuit at block 208.

When a second electrical short circuit is detected (block 208), at block 210 the control circuitry 112 commands the power circuitry 114 to output welding-type power to the electrode 108. Providing welding-type power to the output initiates a welding arc between the electrode 108 and the workpiece 120. In some examples, the control circuitry 112 delays initiating the output of the welding-type power for a predetermined period of time after detecting the second electrical short circuit. In some examples, the predetermined period of time is set by an operator via the user interface 116.

At block 212, the control circuitry 112 detects whether the welding arc has been terminated. The welding arc may be terminated, for example, by the operator moving the electrode 108 a sufficient distance away from the workpiece 120 to extinguish the arc and/or by controlling the output to extinguish the arc via a control device (e.g., a foot pedal or other control device). The control circuitry 112 may monitor for the termination of the welding arc via monitoring the voltage between the electrode 108 and the workpiece 120, via the voltage sensor 122. If the control circuitry 112 does not detect a termination of the welding arc (block 212), the control circuitry 112 returns control to block 210 to continue outputting the welding-type power.

When the control circuitry 112 does detect termination of the welding arc (block 212), at block 214, the control circuitry 112 terminates the shielding gas flow by, for example, commanding the shielding gas valve 118 to close. In some examples, the control circuitry 112 terminates the shielding gas flow after a delay after detecting the termination of the welding arc at block 212. Continuing shielding gas flow after the termination of the welding arc may be advantageous in order to prevent oxidation or other contamination while the weld cools. In some examples, the delay may be programmed as a predetermined period of time. In some examples, the predetermined period of time is set by an operator via the user interface 116. In some examples, the delay may be set based on the selected or performed welding process. In some examples, the control circuitry 112 may receive an indication of the temperature of the weld bead, for example via an infrared thermometer, and terminate the shielding gas flow when the weld bead cools to a temperature sufficient to prevent oxidation or other contamination.

Figure 3:
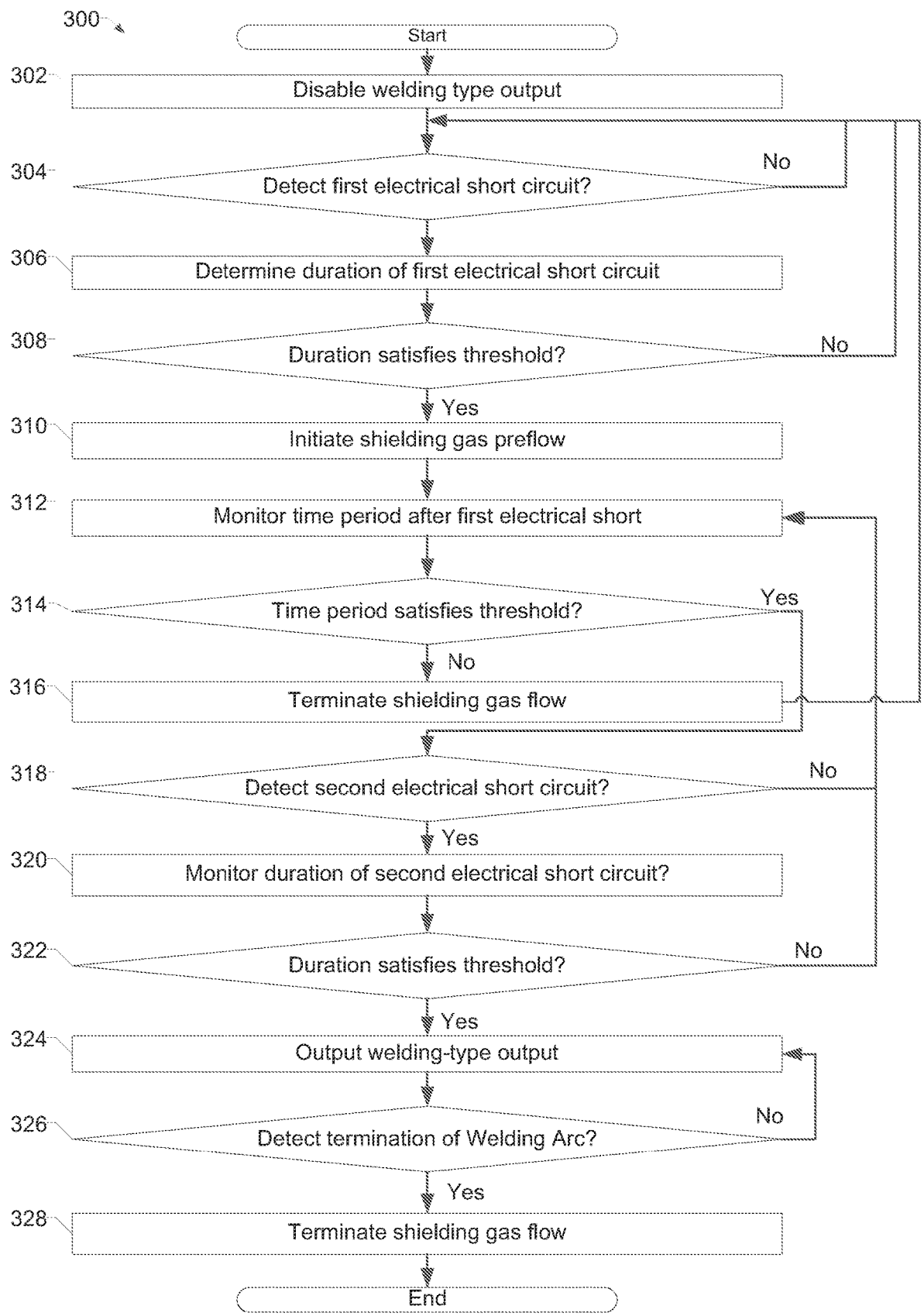
FIG. 3 is a flow chart representative of example machine readable instructions which may be executed by the power supply of FIG. 1 to initiate and control a GTAW process.

FIG. 3 is a flow chart representative of machine readable instructions 300 which may be executed by the power supply 102 of FIG. 1 to initiate and control starting of a GTAW welding process. The machine readable instructions 300 may be partially or completely implemented by control circuitry 112 of FIG. 1. The example instructions 300 begin while no welding is taking place (e.g., while no arc is present, such as prior to a welding operation).

At block 302, the control circuitry 112 disables the welding-type output from the power circuitry 114. Disabling the welding-type output can include any of physically and/or electrically disconnecting the power circuitry 114 from the output (i.e. disconnecting the electrode 108 from the power circuitry 114), controlling the power circuitry 114 to not generate an output, and/or any other method of preventing or blocking output from the power circuitry 114.

At block 304, the control circuitry 112 detects whether a first electrical short circuit between the electrode 108 and the workpiece 120 has occurred. For example, the control circuitry 112 may monitor the output of the voltage sensor 122 to determine whether the voltage has dropped below a threshold indicative of a short circuit between the torch 104 and the workpiece 108 (e.g., via the filler metal rod 124). In some other examples, touch detection circuitry 128 may be used in parallel with the power circuitry 114 to detect a short circuit. For example, the touch detection circuitry 128 outputs a voltage between the torch 104 and the workpiece 108 with a low-current output to prevent arcing. When the low current touch detection circuitry 128 detects that an output current is flowing from the touch detection circuitry 128, the low current touch detection circuitry 128 detects the short circuit and provides a signal to the control circuitry 112.

If no electrical short circuit is detected (block 304), then the control circuitry 112 returns to block 304 and continues monitoring for a short circuit. If the control circuitry 112 detects a first electrical short circuit (block 304), at block 306 the control circuitry 112 detects the end of the first electrical short circuit and determines the duration of the first electrical short circuit.

At block 308, the control circuitry 112 compares the duration to a threshold duration. The threshold duration may be, for example, preprogrammed or input by an operator via the user interface 116. If the duration of the first electrical short circuit does not satisfy the threshold duration (block 308), then the control circuitry 112 returns to block 304. If the duration of the first electrical short circuit satisfies the duration (block 308), at block 310 the control circuitry 112 initiates a shielding gas flow to the torch 104. For example, the control circuitry 112 may initiate the shielding gas flow by commanding the shielding gas valve 118 to open. The control circuitry 112 may ensure that the first electrical short circuit satisfies a threshold duration before initiating shielding gas flow in order to prevent false positives.

After determining the end of the first electrical short circuit, at block 312 the control circuitry 112 monitors the time period since the end of the first electrical short circuit. At block 314, the control circuitry 112 compares the time period since the end of the first electrical short circuit. If the time period satisfies a threshold duration (block 314), at block 316 the control circuitry 112 terminates the shielding gas flow to prevent the waste of shielding gas. The control circuitry 112 then returns to block 304.

If the time period does not satisfy the threshold time period (block 314), at block 318 the control circuitry 112 detects a second electrical short circuit. If the control circuitry 112 does not detect a second electrical short circuit (block 318), then the control circuitry 112 returns to block 312 and continues to monitor the time period since the end of the first electrical short circuit. If the control circuitry 112 detects a second electrical short circuit (block 318), at block 320 the control circuitry 112 monitors the duration of the second electrical short circuit. At block 322, the control circuitry 112 compares the duration of the second electrical short circuit to a threshold duration. The threshold duration may be preprogrammed, or selected by an operator via the user interface 116. If the duration does not satisfy the threshold duration (block 322), then the control circuitry 112 returns to block 312.

If the duration satisfies the threshold duration (block 322), at block 324 the control circuitry 112 commands the power circuitry 114 to output welding-type power to the electrode 108. Providing welding-type power to the output initiates a welding arc between the electrode 108 and the workpiece 120. In some examples, the control circuitry 112 delays initiating the output of the welding-type power for a predetermined period of time after detecting the second electrical short circuit. In some examples, the predetermined period of time is set by an operator via the user interface 116.

At block 326, the control circuitry 112 detects whether the welding arc has been terminated. The welding arc may be terminated, for example, by the operator moving the electrode 108 a sufficient distance away from the workpiece 120 to extinguish the arc and/or by controlling the output to extinguish the arc via a control device (e.g., a foot pedal or other control device. The control circuitry 112 may monitor for the termination of the welding arc via monitoring the voltage between the electrode 108 and the workpiece 120, via the voltage sensor 122. If the control circuitry 112 does not detect a termination of the welding arc (block 326), the control circuitry 112 returns to block 324 to continue to outputting welding-type power.

When the control circuitry 112 does detect termination of the welding arc (block 326), at block 328, the control circuitry 112 terminates the shielding gas flow, for example by commanding the shielding gas valve 118 to close. In some examples, the control circuitry 112 terminates the shielding gas flow after a delay after detecting the termination of the welding arc at block 326. Continuing shielding gas flow after the termination of the welding arc may be advantageous in order to prevent oxidation or other contamination while the weld cools. In some examples, the delay may be programmed as a predetermined period of time. In some examples, the predetermined period of time is set by an operator via the user interface 116. In some examples, the delay may be set based on the selected or performed welding process. In some examples, the control circuitry 112 may receive an indication of the temperature of the weld bead, for example via an infrared thermometer, and terminate the shielding gas flow when the weld bead cools to a temperature sufficient to prevent oxidation or other contamination.

Figure 4:
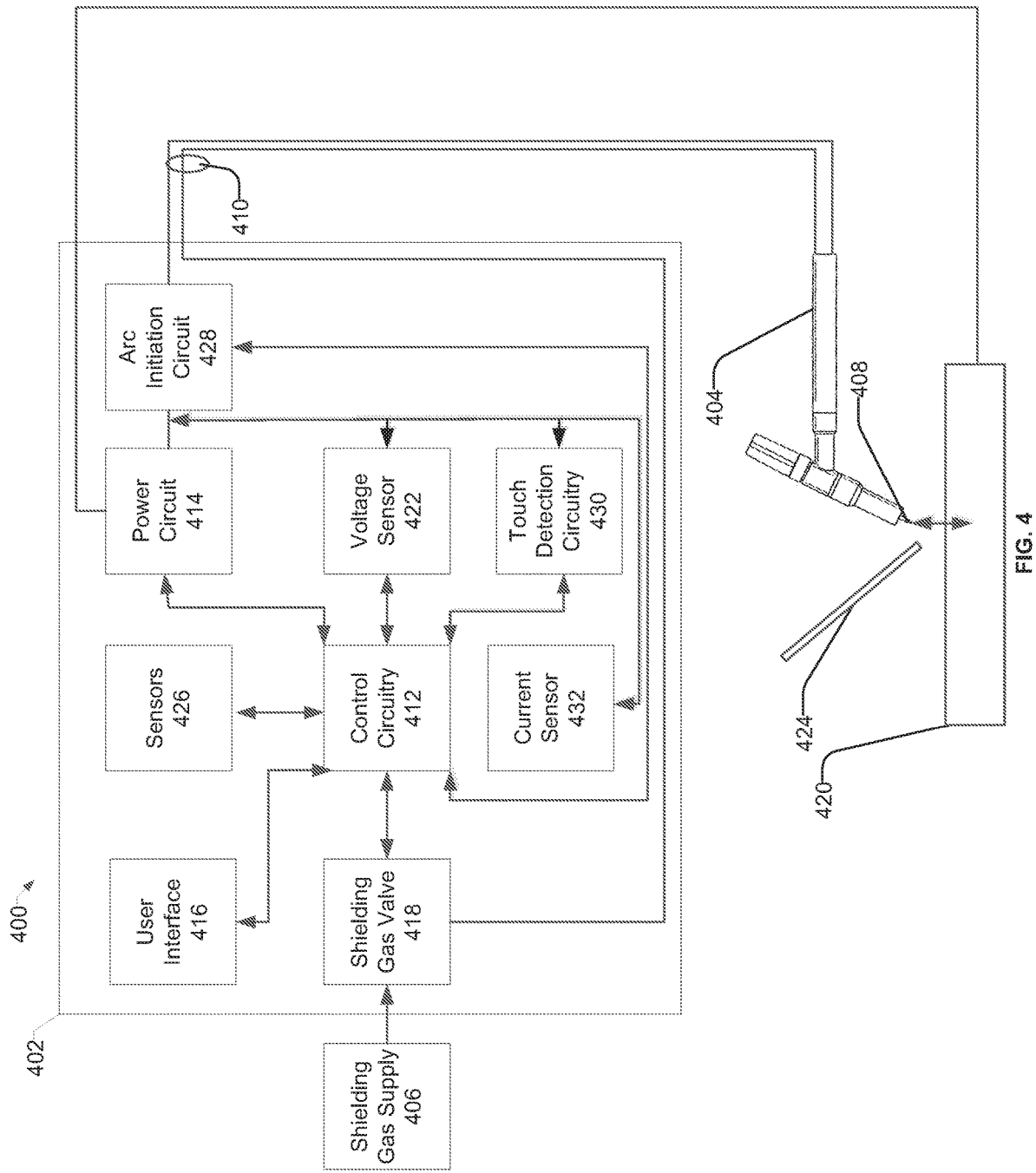
FIG. 4 is a block diagram of another example GTAW welding system, including an arc initiation circuit, in accordance with aspects of this disclosure.

FIG. 4 shows a block diagram of an example TIG welding-type system 400. Welding system 400, similarly to welding system 100 of FIG. 1, has a power supply 402, a TIG torch 404, and a shielding gas supply 406. The torch 404 has an electrode 408. The torch 404 is connected to the power supply 402 and shielding gas supply 406 via conduit 410. The power supply 402 includes control circuitry 412 connected to power circuitry 414, a user interface 416, a shielding gas valve 418, a voltage sensor 422, and other sensors 426. The torch 404 is configures to strike an arc between the electrode 408 and the workpiece 420 and melt a filler metal rod 424. The power supply 402 also includes an arc initiation circuit 428 connected to the control circuitry 412. The arc initiation circuit 428 is configured to initiate and/or maintain an arc between the electrode 408 and the workpiece 420 with little or no contact between the electrode 408 and the workpiece 420. In some examples, an operator may select an arc initiation method via the user interface 416. For example, an operator may select a lift start, a scratch start, a flick start, one of the disclosed methods, for example methods 200 or 300, or a starting method that uses the arc initiation circuit 428, as described in more detail below. In some examples, the power supply 402 may include low current touch detection circuitry 430.

The arc initiation circuit 428 may be a circuit configured to output a high-frequency high-voltage arc initiation signal, which may be superimposed on the welding-type output from the power circuitry 414. The voltage of the high-frequency high-voltage signal may preferably be 12,000 Vpp, but may alternatively be between 2,000 Vpp and 25,000 Vpp. The frequency of the high-frequency high-voltage arc initiation signal may preferably be between 700 kHz and 1.5 MHz.

Example implementations of arc initiation circuits are described in U.S. Pat. No. 6,075,224 by Albert De Coster, filed Apr. 1, 1998, titled "Method of And Apparatus for Initiating a Welding Arc." The entirety of U.S. Pat. No. 6,075,224 is incorporated by reference. Example implementations of arc initiation circuits are also described in U.S. Pat. No. 9,108,263 by Alan Manthe et. al., filed Apr. 30, 2007, titled "Welding Power Source With Automatic Variable High Frequency." The entirety of U.S. Pat. No. 9,108,263 is incorporated by reference. Example implementations of arc initiation circuits are also described in U.S. Pat. No. 10,076,802 by Marc Lee Denis, filed Dec. 3, 2015, titled "Electric Arc Start Systems and Methods." The entirety of U.S. Pat. No. 10,076,802 is incorporated by reference.

Figure 5:
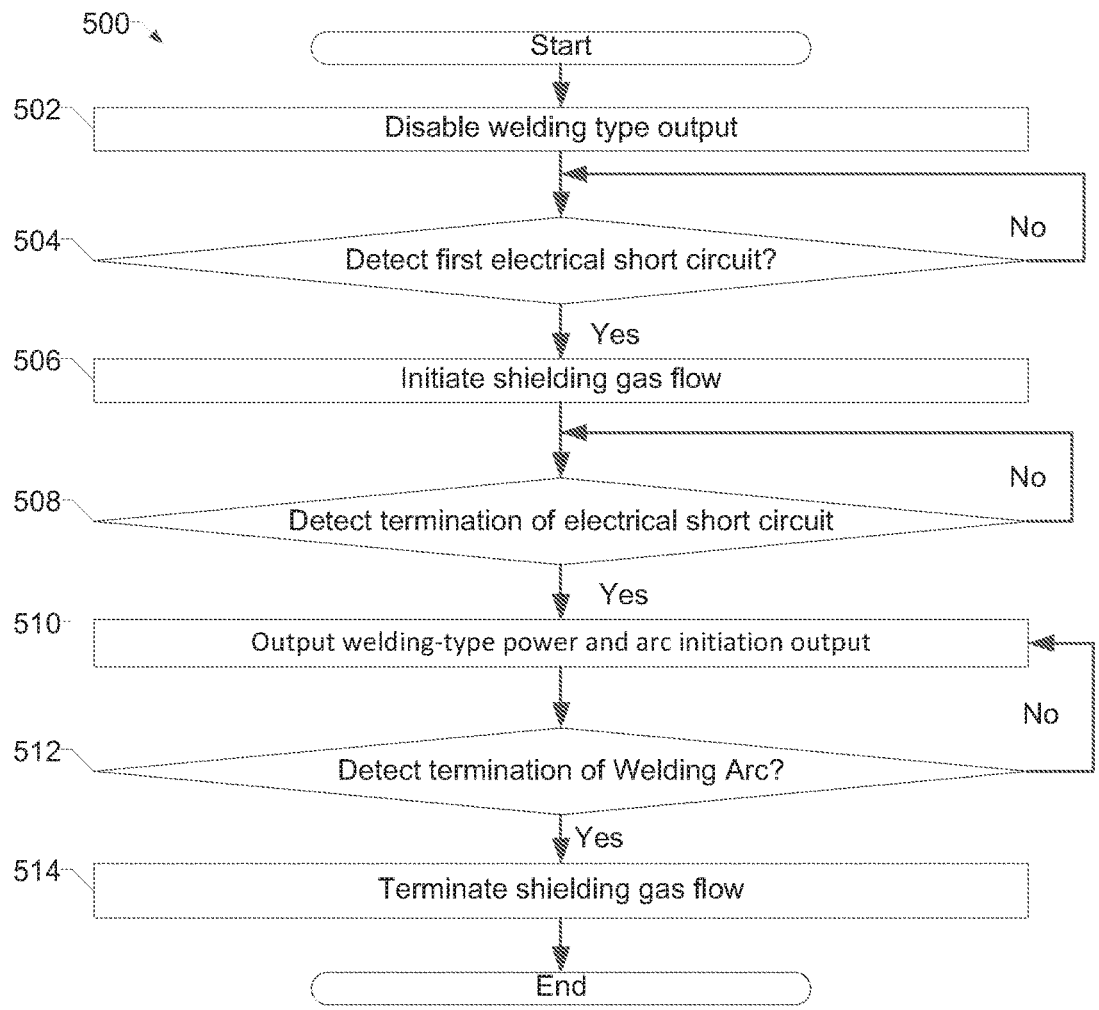
FIG. 5 is a flow chart representative of example machine readable instructions which may be executed by the power supply of FIG. 4 to initiate and control a GTAW process.

FIG. 5 is a flow chart representative of example machine readable instructions 500 which may be executed by the power supply 402 of FIG. 4 to initiate and control starting of a GTAW welding process. The machine readable instructions 500 may be partially or completely implemented by the control circuitry 412 of FIG. 4. The example instructions 500 begin while no welding is taking place (e.g., while no arc is present, such as prior to a welding operation).

At block 502, the control circuitry 412 disables the welding-type output from the power circuitry 414. Disabling the welding-type output can include any of physically and/or electrically disconnecting the power circuitry 414 from the output (i.e. disconnecting the electrode 408 from the power circuitry 414), controlling the power circuitry 414 to not generate an output, and/or any other method of preventing or blocking output from the power circuitry 414.

At block 504, the control circuitry 412 detects whether an electrical short circuit between the electrode 408 and the workpiece 420 has occurred. For example, the control circuitry 412 may monitor the output of the voltage sensor 422 to determine whether the voltage has dropped below a threshold indicative of a short circuit between the torch 404 and the workpiece 408 (e.g., via the filler metal rod 424). In some other examples, touch detection circuitry 430 may be used in parallel with the power circuitry 414 to detect a short circuit. For example, the touch detection circuitry 430 outputs a voltage between the torch 404 and the workpiece 408 with a low-current output to prevent arcing. When the low current touch detection circuitry 430 detects that an output current is flowing from the touch detection circuitry 430, the low current touch detection circuitry 430 detects the short circuit and provides a signal to the control circuitry 412.

If no electrical short circuit is detected (block 504), then the control circuitry 412 returns to block 504 and continues monitoring for a short circuit. If the control circuitry 412 detects an electrical short circuit (block 504), at block 506 the control circuitry initiates a shielding gas flow to the torch 404. For example, the control circuitry 412 may initiate the shielding gas flow by commanding the shielding gas valve 418 to open.

At block 508, the control circuitry 412 then detects whether the electrical short circuit has been terminated. The control circuitry 412 may detect the termination of the electrical short circuit via the voltage sensor 422 or the low current touch detection circuitry 430. When the control circuitry 412 detects that the first electrical short circuit has been terminated (block 508), at block 510 the control circuitry 412 commands the power circuitry 414 to output welding-type power to the electrode 408 and the arc initiation circuit 428 to output an arc initiation output to the electrode 408. In some examples, the arc initiation output is a high frequency high voltage signal superimposed on the welding-type output. Outputting the welding-type power and the arc initiation output to the electrode 408 after the termination of the electrical short circuit strikes an arc between the electrode 408 and the workpiece 420. In some examples, the arc initiation output is only output until an arc is initiated. In some examples, the arc initiation output is continually output as long as the welding-type power is output in order to control and maintain the arc.

At block 512, the control circuitry 412 detects whether the welding arc has been terminated. The welding arc may be terminated, for example, by the operator moving the electrode 408 a sufficient distance away from the workpiece 420 to extinguish the arc and/or by controlling the output to extinguish the arc via a control device (e.g., a foot pedal or other control device). The control circuitry 412 may monitor for the termination of the welding arc via monitoring the voltage between the electrode 408 and the workpiece 420, via the voltage sensor 422. If the control circuitry 412 does not detect a termination of the welding arc (block 512), the control circuitry 412 returns to block 510 to continue to outputting welding-type power.

If the control circuitry 412 does detect a termination of the welding arc (block 512), at block 514 the control circuitry 412 terminates the shielding gas flow, for example by commanding the shielding gas valve 418 to close. In some examples, the control circuitry 412 terminates the shielding gas flow after a delay after detecting the termination of the welding arc at block 512. Continuing shielding gas flow after the termination of the welding arc may be advantageous in order to prevent oxidation or other contamination while the weld cools. In some examples, the delay may be programmed as a predetermined period of time. In some examples, the predetermined period of time is set by an operator via the user interface 416. In some examples, the delay may be set based on the selected or performed welding process. In some examples, the control circuitry 412 may receive an indication of the temperature of the weld bead, for example via an infrared thermometer, and terminate the shielding gas flow when the weld bead cools to a temperature sufficient to prevent oxidation or other contamination.

Figure 6:
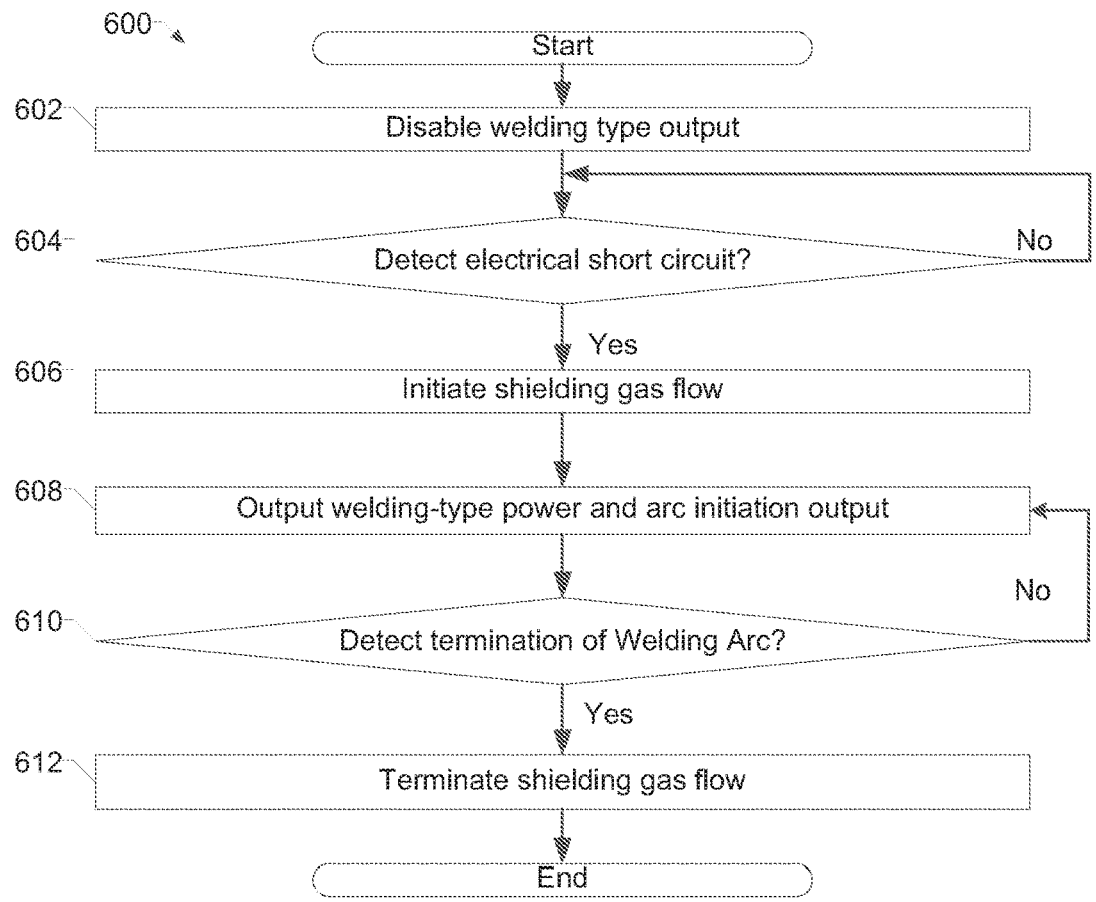
FIG. 6 is a flow chart representative of example machine readable instructions which may be executed by the power supply of FIG. 4 to initiate and control a GTAW process.

FIG. 6 is a flow chart representative of example machine readable instructions 600 which may be executed by the power supply 402 of FIG. 4 to initiate and control starting of a GTAW welding process. The machine readable instructions 600 may be partially or completely implemented by the control circuitry 412 of FIG. 4. The example instructions 600 begin while no welding is taking place (e.g., while no arc is present, such as prior to a welding operation).

At block 602, the control circuitry 412 disables the welding-type output from the power circuitry 414. Disabling the welding-type output can include any of physically and/or electrically disconnecting the power circuitry 414 from the output (i.e. disconnecting the electrode 408 from the power circuitry 414), controlling the power circuitry 414 to not generate an output, and/or any other method of preventing or blocking output from the power circuitry 414.

At block 604, the control circuitry 412 detects whether an electrical short circuit between the electrode 408 and the workpiece 420 has occurred. For example, the control circuitry 412 may monitor the output of the voltage sensor 422 to determine whether the voltage has dropped below a threshold indicative of a short circuit between the torch 404 and the workpiece 408 (e.g., via the filler metal rod 424). In some other examples, touch detection circuitry 430 may be used in parallel with the power circuitry 414 to detect a short circuit. For example, the touch detection circuitry 430 outputs a voltage between the torch 404 and the workpiece 408 with a low-current output to prevent arcing. When the low current touch detection circuitry 430 detects that an output current is flowing from the touch detection circuitry 430, the low current touch detection circuitry 430 detects the short circuit and provides a signal to the control circuitry 412.

If no electrical short circuit is detected (block 604), then the control circuitry 412 returns to block 604 and continues monitoring for a short circuit. If the control circuitry 412 detects an electrical short circuit (block 604), at block 606 the control circuitry initiates a shielding gas flow to the torch 404. For example, the control circuitry 412 may initiate the shielding gas flow by commanding the shielding gas valve 418 to open.

At block 608, the control circuitry 412 commands the power circuitry 414 to output welding-type power to the electrode 408 and the arc initiation circuit 428 to output an arc initiation output to the electrode 408. In some examples, the arc initiation output is a high frequency high voltage signal superimposed on the welding-type output. Outputting the welding-type power and the arc initiation output to the electrode 408 after the termination of the electrical short circuit strikes an arc between the electrode 408 and the workpiece 420. In some examples, the control circuitry 412 delays for a predetermined period of time after detecting the electrical short circuit at block 604 before outputting the welding-type power and the arc initiation output. Delaying the output of the welding-type power and the arc initiation output allows the shielding gas to sufficiently shield the welding area in order to prevent oxidation and other contamination. Delaying the welding-type power and the arc initiation output may also allow the operator time to position the welding torch 404 as desired.

At block 610, the control circuitry 412 detects whether the welding arc has been terminated. The welding arc may be terminated, for example, by the operator moving the electrode 408 a sufficient distance away from the workpiece 420 to extinguish the arc and/or by controlling the output to extinguish the arc via a control device (e.g., a foot pedal or other control device). The control circuitry 412 may monitor for the termination of the welding arc via monitoring the voltage between the electrode 408 and the workpiece 420, via the voltage sensor 422. If the control circuitry 412 does not detect a termination of the welding arc (block 610), the control circuitry 412 returns to block 608 to continue to outputting welding-type power.

If the control circuitry 412 does detect a termination of the welding arc (block 610), at block 612 the control circuitry 412 terminates the shielding gas flow, for example by commanding the shielding gas valve 418 to close. In some examples, the control circuitry 412 terminates the shielding gas flow after a delay after detecting the termination of the welding arc at block 610. Continuing shielding gas flow after the termination of the welding arc may be advantageous in order to prevent oxidation or other contamination while the weld cools. In some examples, the delay may be programmed as a predetermined period of time. In some examples, the predetermined period of time is set by an operator via the user interface 416. In some examples, the delay may be set based on the selected or performed welding process. In some examples, the control circuitry 412 may receive an indication of the temperature of the weld bead, for example via an infrared thermometer, and terminate the shielding gas flow when the weld bead cools to a temperature sufficient to prevent oxidation or other contamination.

Figure 7:
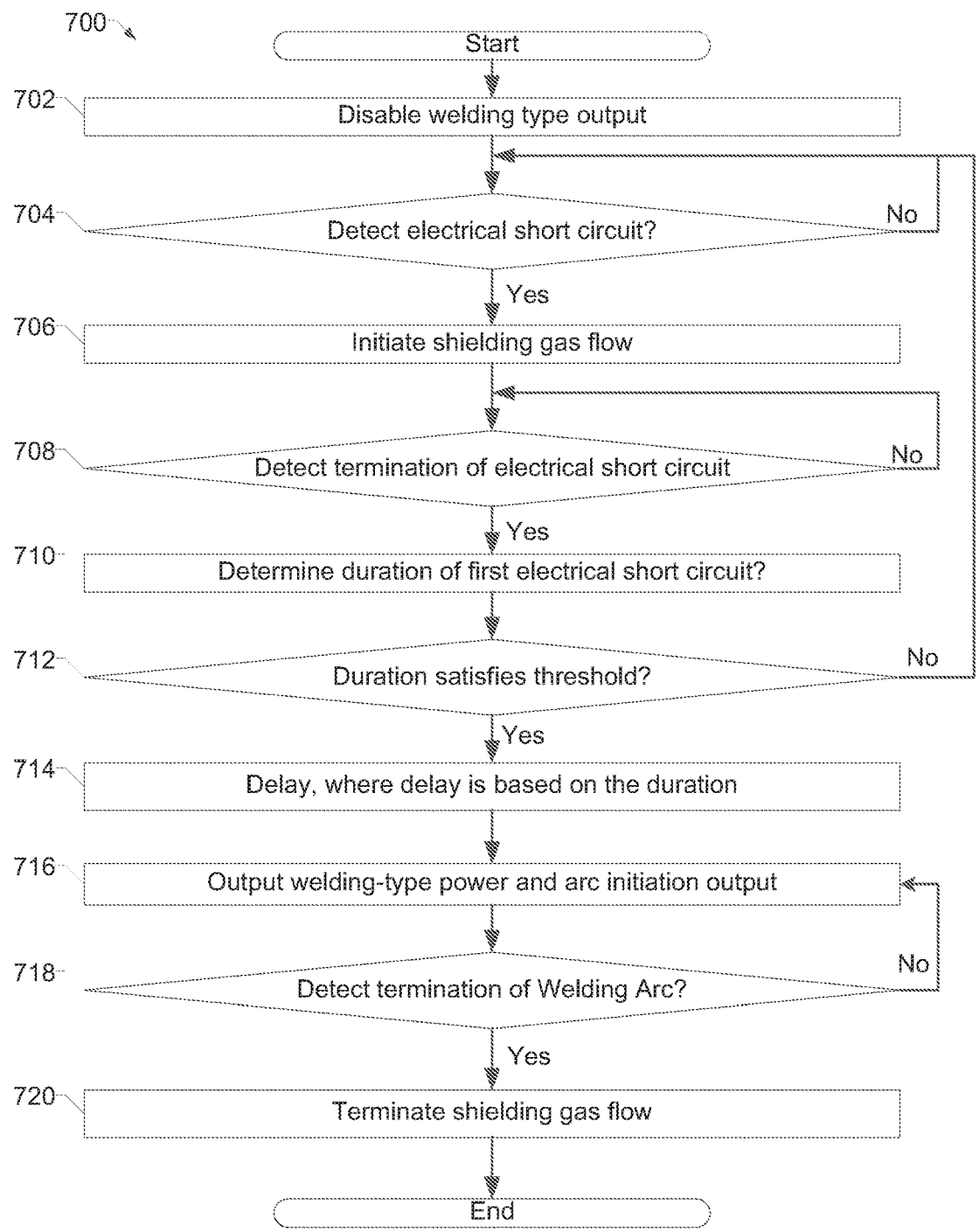
FIG. 7 is a flow chart representative of example machine readable instructions which may be executed by the power supply of FIG. 4 to initiate and control a GTAW process.

FIG. 7 is a flow chart representative of example machine readable instructions 700 which may be executed by the power supply 402 of FIG. 4 to initiate and control starting of a GTAW welding process. The machine readable instructions 700 may be partially or completely implemented by the control circuitry 412 of FIG. 4. The example instructions 700 begin while no welding is taking place (e.g., while no arc is present, such as prior to a welding operation).

At block 702, the control circuitry 412 disables the welding-type output from the power circuitry 414. Disabling the welding-type output can include any of physically and/or electrically disconnecting the power circuitry 414 from the output (i.e. disconnecting the electrode 408 from the power circuitry 414), controlling the power circuitry 414 to not generate an output, and/or any other method of preventing or blocking output from the power circuitry 414.

At block 704, the control circuitry 412 detects whether an electrical short circuit between the electrode 408 and the workpiece 420 has occurred. For example, the control circuitry 412 may monitor the output of the voltage sensor 422 to determine whether the voltage has dropped below a threshold indicative of a short circuit between the torch 404 and the workpiece 408 (e.g., via the filler metal rod 424). In some other examples, touch detection circuitry 430 may be used in parallel with the power circuitry 414 to detect a short circuit. For example, the touch detection circuitry 430 outputs a voltage between the torch 404 and the workpiece 408 with a low-current output to prevent arcing. When the low current touch detection circuitry 430 detects that an output current is flowing from the touch detection circuitry 430, the low current touch detection circuitry 430 detects the short circuit and provides a signal to the control circuitry 412.

If no electrical short circuit is detected (block 704), then the control circuitry 412 returns to block 704 and continues monitoring for a short circuit. If the control circuitry 412 detects an electrical short circuit (block 704), at block 706 the control circuitry initiates a shielding gas flow to the torch 404. For example, the control circuitry 412 may initiate the shielding gas flow by commanding the shielding gas valve 418 to open.

After detecting the electrical short circuit at block 704, at block 708 the control circuitry 412 detects whether the electrical short circuit has been terminated. If the control circuitry 412 detects the termination of the electrical short circuit (block 708), then at block 710 the control circuitry 412 computes the duration of the electrical short circuit.

At block 712, the control circuitry 412 compares the duration to a threshold duration. If the duration does not satisfy the threshold (block 712), then the control circuitry 412 returns to block 704. In some examples, if the duration does not satisfy the threshold (block 712), the control circuitry 412 may also command the shielding gas valve 418 to close in order to stop the flow of shielding gas to the torch 404.

If the duration satisfies a threshold (block 712), at block 714 the control circuitry 412 enters a delay, where the delay is based on the duration determined in block 710. For example, the delay may equal the determined duration. At block 716, the control circuitry 412 commands the power circuitry 414 to output welding-type power to the electrode 408 and the arc initiation circuit 428 to output an arc initiation output to the electrode 408. In some examples, the arc initiation output is a high frequency high voltage signal superimposed on the welding-type output. Outputting the welding-type power and the arc initiation output to the electrode 408 after the termination of the electrical short circuit strikes an arc between the electrode 408 and the workpiece 420. Delaying the output of the welding-type power and the arc initiation output at block 714 allows the shielding gas to sufficiently shield the welding area in order to prevent oxidation and other contamination. Delaying the welding-type power and the arc initiation output may also allow the operator time to position the welding torch 404 as desired. Basing the delay on the duration determined in block 710 allows the operator to control the delay period.

After initiating a welding arc at block 716, at block 718 the control circuitry 412 detects whether the welding arc has been terminated. The welding arc may be terminated, for example, by the operator moving the electrode 408 a sufficient distance away from the workpiece 420 to extinguish the arc and/or by controlling the output to extinguish the arc via a control device (e.g., a foot pedal or other control device). The control circuitry 412 may monitor for the termination of the welding arc via monitoring the voltage between the electrode 408 and the workpiece 420, via the voltage sensor 422. If the control circuitry 412 does not detect a termination of the welding arc (block 718), the control circuitry 412 returns to block 716 to continue to outputting welding-type power.

If the control circuitry 412 does detect a termination of the welding arc (block 718), at block 720 the control circuitry 412 terminates the shielding gas flow, for example by commanding the shielding gas valve 418 to close. In some examples, the control circuitry 412 terminates the shielding gas flow after a delay after detecting the termination of the welding arc at block 718. Continuing shielding gas flow after the termination of the welding arc may be advantageous in order to prevent oxidation or other contamination while the weld cools. In some examples, the delay may be programmed as a predetermined period of time. In some examples, the predetermined period of time is set by an operator via the user interface 416. In some examples, the delay may be set based on the selected or performed welding process. In some examples, the control circuitry 412 may receive an indication of the temperature of the weld bead, for example via an infrared thermometer, and terminate the shielding gas flow when the weld bead cools to a temperature sufficient to prevent oxidation or other contamination.

Welding-type power supply and welding power source, as used herein, refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Welding operation, as used herein, includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

Control circuitry, as used herein, includes digital and analog circuitry, discrete or integrated circuitry, microprocessors, DSPs, etc., software, hardware and firmware, located on one or more boards, that form part or all of a controller, and are used to control a welding process, or a device such as a power source or wire feeder.

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system comprising:
a welding-type torch holding an electrode;
a welding-type power supply configured to output welding-type power to the welding-type torch to create a welding-type arc between the electrode and a workpiece, wherein the welding-type power supply comprises:
control circuitry; and
a sensor in communication with the control circuitry and the welding-type torch, wherein the control circuitry is configured to:
control the welding-type power supply to disable output of the welding-type power based on an absence of a welding-type arc;
detect a first electrical short circuit between the electrode and the workpiece;
in response to the detection of the first electrical short circuit, control a shielding gas valve to enable a flow of shielding gas to the welding-type torch, the welding-type torch holding the electrode;
detect a second electrical short circuit between the electrode and the workpiece; and
control the welding-type power supply to output the welding-type power in response to the detection of the second electrical short circuit.

2. The welding-type system of claim 1, wherein the control circuitry is configured to:
monitor a first time period of the first electrical short circuit and a second time period of the second electrical short circuit;
control the shielding gas valve to enable the flow of the shielding gas when the first time period satisfies a first threshold time period; and
control the welding-type power supply to output the welding-type power when the second time period satisfies a second threshold time period.

3. The welding-type system of claim 1, wherein the control circuitry is configured to:
monitor a first time period between the first electrical short circuit and the second electrical short circuit; and
control the shielding gas valve to terminate the flow of shielding gas if the first time period satisfies a threshold time period.

4. The welding-type system of claim 1, wherein the control circuitry is further configured to:
detect termination of a welding arc after initiation of the welding arc generated using the welding-type power; and
control the shielding gas valve to terminate the flow of shielding gas in response to detecting the termination of the welding arc.

5. The welding-type system of claim 4, wherein the control circuitry controls the shielding gas valve to terminate the flow of shielding gas after a delay following detecting the termination of the welding arc.

6. The welding-type system of claim 1, wherein the welding-type power supply comprises the control circuitry.

7. A welding-type system comprising:
a welding-type torch holding an electrode; and
a welding-type power supply comprising:
a power circuit configured to output welding-type power to the welding-type torch to create a welding-type arc between the electrode and a workpiece;
an arc initiation circuit configured to output an arc initiation output to the welding-type torch;
control circuitry; and
a sensor in communication with the control circuitry and the torch holding an electrode, wherein the control circuitry is configured to:
control the power circuit of the welding-type power supply to disable output of the welding-type power based on an absence of a welding-type arc;
detect an electrical short circuit between an electrode and the workpiece in an absence of the welding-type power, the welding-type torch holding the electrode; and
based on the detection of the electrical short circuit, control the welding-type power supply to output the welding-type power and control the arc initiation circuit to output the arc initiation output.

8. The welding-type system of claim 7, wherein the control circuitry is configured to control the welding-type power supply to output the welding-type power and control the arc initiation circuit to output the arc initiation output after a delay following the detection of the electrical short circuit.

9. The welding-type system of claim 7, wherein the control circuitry is configured to:
monitor a time period of the electrical short circuit, and
control the welding-type power supply to output the welding-type power and control the arc initiation circuit to output the arc initiation output when the time period satisfies a threshold time period.

10. The welding-type system of claim 7, wherein the control circuitry is configured to control the welding-type power supply to output the welding-type power and control the arc initiation circuit to output the arc initiation output after a delay after detecting termination of the electrical short circuit.

11. The welding-type system of claim 10, wherein the control circuitry is configured to monitor a time period of the electrical short circuit, and wherein a duration of the delay is based on the monitored time period of the electrical short circuit.

12. The welding-type system of claim 7, wherein the control circuitry is configured to:
in response to the detection of the electrical short circuit, control a shielding gas valve to enable a flow of shielding gas to the welding-type torch;
detect termination of a welding arc after initiation of the welding arc generated using the welding-type power; and
control the shielding gas valve to terminate the flow of shielding gas in response to detecting the termination of the welding arc.

13. The welding-type system of claim 4, wherein the control circuitry controls the shielding gas valve to terminate the flow of shielding gas after a delay following detecting the termination of the welding arc.

14. The welding-type system of claim 7, wherein the welding-type power supply comprises the arc initiation circuit and the control circuitry.

15. A welding-type system comprising:
a welding-type torch holding an electrode; and
a welding-type power supply comprising:
a power circuit configured to output welding-type power to the welding-type torch to create a welding-type arc between the electrode and a workpiece;
an arc initiation circuit configured to output an arc initiation output to the welding-type torch
control circuitry; and
a voltage or current sensor in communication with the control circuitry and the torch holding an electrode, wherein the control circuitry is configured to:
control the power circuit of the welding-type power supply to disable output of the welding-type power based on an absence of a welding-type arc;
monitor a voltage or a current between the welding-type torch and the workpiece in an absence of the welding-type power;
detect an electrical short circuit between an electrode and the workpiece in the absence of the welding-type power, the welding-type torch holding the electrode;
detect termination of the electrical short circuit; and
in response to the detection of the termination of the electrical short circuit, control the power circuit of the welding-type power supply to output the welding-type power and control the arc initiation circuit to output the arc initiation output.

16. The welding-type system of claim 15, wherein the control circuitry is configured to, in response to the detection of the electrical short circuit, control a shielding gas valve to enable a flow of shielding gas to the welding-type torch.

17. The welding-type system of claim 16, wherein the control circuitry is configured to:
detect termination of a welding arc after initiation of the welding arc generated using the welding-type power; and
control the shielding gas valve to terminate the flow of shielding gas in response to detecting the termination of the welding arc.

18. The welding-type system of claim 17, wherein the control circuitry controls the shielding gas valve to terminate the flow of shielding gas after a delay following detecting the termination of the welding arc.

19. The welding-type system of claim 15, wherein the control circuitry is configured to control the power circuit of the welding-type power supply to output the welding-type power and control the arc initiation circuit to output the arc initiation output after a delay after detecting termination of the electrical short circuit.

20. The welding-type system of claim 15, wherein the welding-type power supply comprises the arc initiation circuit and the control circuitry.

* * * * *